United States Patent
Osgood et al.

(10) Patent No.: US 8,342,753 B2
(45) Date of Patent: Jan. 1, 2013

(54) VENTURI DRAIN FOR SELF-PUMPING BEARING ROLLING MILLS

(75) Inventors: Peter N. Osgood, Westborough, MA (US); Thomas C. Wojtkowski, Jr., Shrewsbury, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 408 days.

(21) Appl. No.: 12/796,071

(22) Filed: Jun. 8, 2010

(65) Prior Publication Data
US 2011/0299801 A1    Dec. 8, 2011

(51) Int. Cl.
F16C 33/74 (2006.01)
F16C 1/24 (2006.01)
F16C 19/00 (2006.01)
F16J 15/34 (2006.01)
F16J 15/32 (2006.01)

(52) U.S. Cl. ........ 384/135; 384/322; 384/397; 384/403; 384/412; 384/414; 384/462; 384/471; 384/472; 277/353; 277/551

(58) Field of Classification Search .................. 384/135, 384/322, 397, 398, 400, 403, 412, 414, 462, 384/471, 472, 473, 478; 277/353, 551, 562, 277/577; 184/6.26, 6.8, 7.1
See application file for complete search history.

(56) References Cited

U.S. PATENT DOCUMENTS

| | | | |
|---|---|---|---|
| 2,848,284 A | 8/1958 | Atkinson et al. | |
| 2,929,663 A | 3/1960 | Hoeltje | |
| 3,514,167 A | 5/1970 | Wahl, Jr | |
| 3,749,464 A | 7/1973 | Satterthwaite | |
| 4,541,785 A | 9/1985 | Hoarler | |
| 4,741,630 A | 5/1988 | Oeynhausen et al. | |
| 5,489,190 A | 2/1996 | Sullivan | |
| 6,086,255 A * | 7/2000 | Lyon | 384/12 |
| 6,146,020 A | 11/2000 | Innis, Jr. | |
| 6,783,131 B2 * | 8/2004 | Martins et al. | 277/564 |

(Continued)

FOREIGN PATENT DOCUMENTS
EP    1609542 A1    12/2005

OTHER PUBLICATIONS

PCT International Search Report dated Aug. 3, 2011 corresponding to PCT Application No. PCT/US2011/036160 filed May 12, 2011.

*Primary Examiner* — Richard W Ridley
*Assistant Examiner* — Adam D Rogers

(57) ABSTRACT

A system is disclosed for use in a rolling mill oil film bearing to remove oil exiting from between a rotating sleeve and a fixed bushing surrounding the sleeve. The system comprises an annular chamber arranged to receive the exiting flow of oil. The chamber is isolated from a drainage sump by confinement surfaces including a seal interface defined by a flexible seal in contact with an adjacent rigid component of the bearing. Impellers project into the chamber and are rotable with and at the velocity of the sleeve to rotatively propel oil around the chamber. A discharge conduit communicates tangentially with the chamber and is arranged to receive a pressurized flow of the oil being rotatively propelled around the chamber. A venturi is located in the discharge conduit. A suction conduit connects the venturi to the drainage sump. Oil escaping from the annular chamber past the seal interface into the drainage sump is aspirated by the venturi for removal via the conduit.

9 Claims, 5 Drawing Sheets

U.S. PATENT DOCUMENTS

| | | |
|---|---|---|
| 6,802,511 B1 | 10/2004 | Martins et al. |
| 6,851,676 B2 * | 2/2005 | Martins et al. ............... 277/353 |
| 7,334,982 B2 | 2/2008 | Singh et al. |
| 7,387,445 B2 | 6/2008 | Swainson |
| 7,625,126 B2 | 12/2009 | Peters et al. |
| 2005/0281499 A1 * | 12/2005 | Wojtkowski et al. ......... 384/473 |
| 2009/0158801 A1 | 6/2009 | Keller et al. |
| 2011/0274380 A1 * | 11/2011 | Wojtkowski et al. ......... 384/322 |
| 2011/0278801 A1 * | 11/2011 | Wojtkowski et al. ......... 277/559 |

* cited by examiner

100
VENTURI DRAIN FOR SELF-PUMPING BEARING ROLLING MILLS

BACKGROUND OF THE INVENTION

1. Field of the Invention

This invention relates to a system for use in a rolling mill oil film bearing to remove a laminar flow of oil exiting tangentially from between a rotating sleeve and a stationary bushing surrounding the sleeve.

2. Description of the Prior Art

In a typical rolling mill oil film bearing, a sleeve surrounds and is rotatable with a roll neck. The sleeve is journalled for rotation within a fixed bushing contained in a chock. The sleeve and bushing are dimensioned to define a gap therebetween. During operation, oil is introduced continuously into the gap where it is rotatably urged into a hydrodynamically maintained film between the sleeve and bushing at the load zone of the bearing. Laminar flows of oil exit tangentially from each end of the bearing into sumps from which the oil is removed by gravity for filtering and cooling before being recirculated back to the bearings.

A drawback of this arrangement is that large diameter drain lines are required to accommodate the gravity flow of oil exiting from the bearings. These drain lines occupy an inordinate amount of exterior space and thus contribute disadvantageously to the overall size of the bearing. Care must also be taken to insure that the drain lines are properly installed with pitches designed to prevent oil from backing up into and flooding the bearing sumps.

SUMMARY OF THE INVENTION

In accordance with the present invention, confinement surfaces, including a seal interface established between a flexible seal and an adjacent bearing component, define an annular chamber isolated from a bearing sump and arranged to receive the laminar flow of oil exiting from between the sleeve and bushing. The thus received oil is rotatively propelled around the chamber by impellers rotating at the speed of the sleeve. A discharge conduit communicates tangentially with the chamber to remove the rotatively propelled oil. A venturi in the discharge conduit is connected to the sump. The venturi serves to aspirate any oil leaking past the seal interface into the sump.

These and other features and advantages of the present invention will now be described in further detail with reference to the accompanying drawings, wherein:

DETAILED DESCRIPTION

Figure 1:
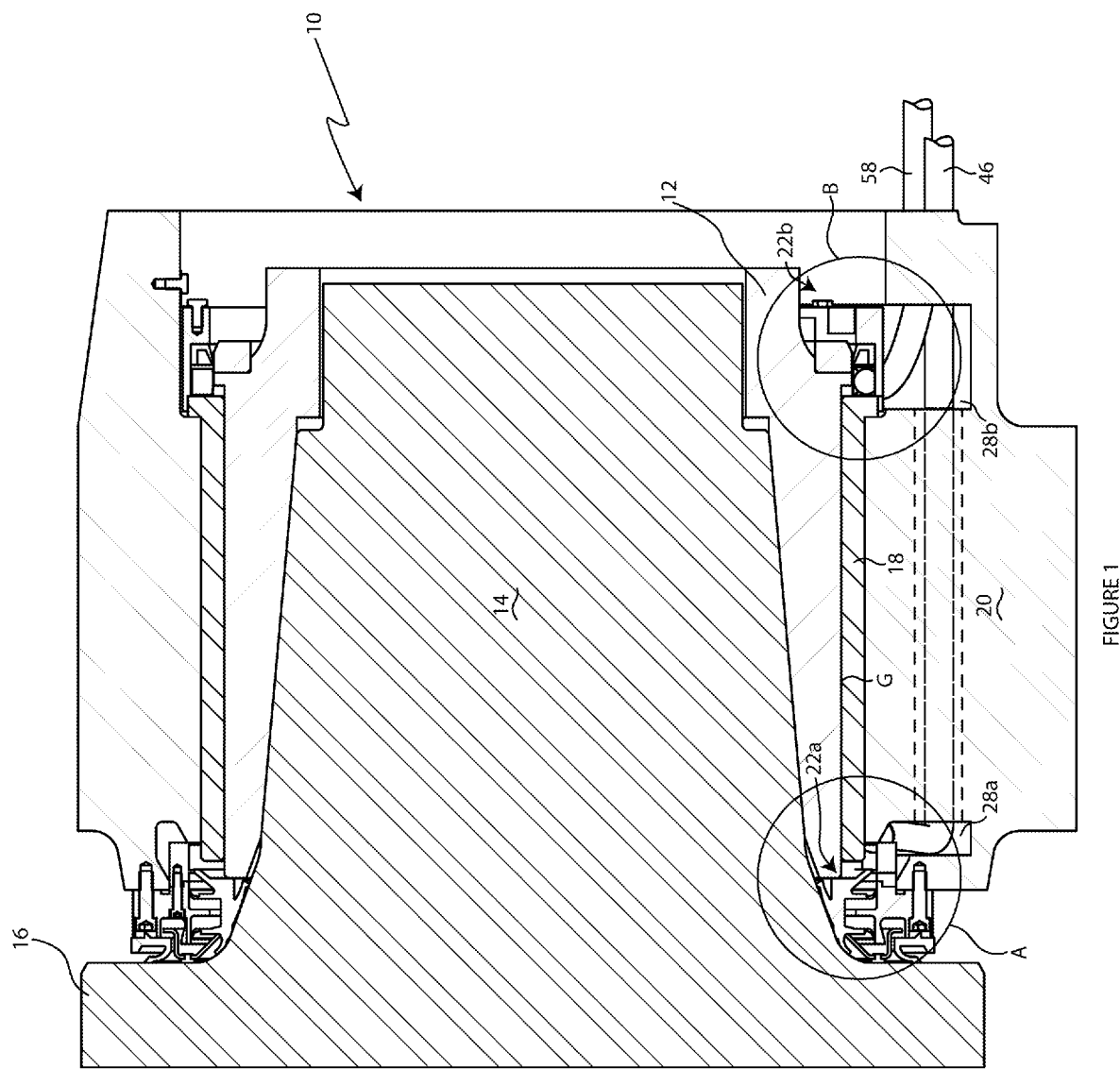
FIG. 1 is a cross sectional view through a rolling mill oil film bearing embodying a system in accordance with the present invention.

With reference initially to FIG. 1, a rolling mill oil film bearing is generally indicated at 10. The bearing includes a sleeve 12 fixed to the tapered neck 14 of a roll 16. The sleeve is journalled for rotation in a fixed bushing 18 contained within a chock 20. The sleeve and bushing are dimensioned to define a gap "G" therebetween. During operation, oil is introduced continuously into the gap where it is rotationally urged by the sleeve into a hydrodynamically maintained film between the sleeve and bushing at the load zone of the bearing. Laminar flows of oil exit tangentially from opposite ends of the bearing.

Seal assemblies 22a, 22b are located respectively at the inboard and outboard ends of the bearing. With additional reference to FIG. 2, it will be seen that the inboard seal assembly 22a includes a flexible and resilient neck seal 24 mounted on the tapered roll neck section 14 for rotation therewith along with the sleeve 12. The neck seal is surrounded by a seal end plate 26 fixed to the chock 20.

In conventional bearings, the laminar flow of oil escaping tangentially from between the sleeve and bushing is received in a sump 28a, from which it is drained by gravity.

With the present invention, however, a circular extension 30 spans a gap between the seal end plate 26 and the chock 20. Flanges 32 on the neck seal sealingly contact shoulders 34 on the seal end plate, and a sealing interface 35 is provided by a flinger 36 on the neck seal in sealing contact with a circular shoulder 38 on extension 30. Confinement surfaces provided by the flinger 36, extension 30, the sealing interface 35 and the chock 20 cooperate with the sleeve 12 and bushing 18 to define an annular inboard chamber 40a isolated from the sump 28a and arranged to receive the laminar flow of oil exiting tangentially from the gap G between the sleeve and bushing. Impellers 42 project into the chamber 40a. As can be best seen by additional reference to FIG. 3, the impellers 42 are carried by and are spaced around the circumference of neck seal 24.

Figure 3:
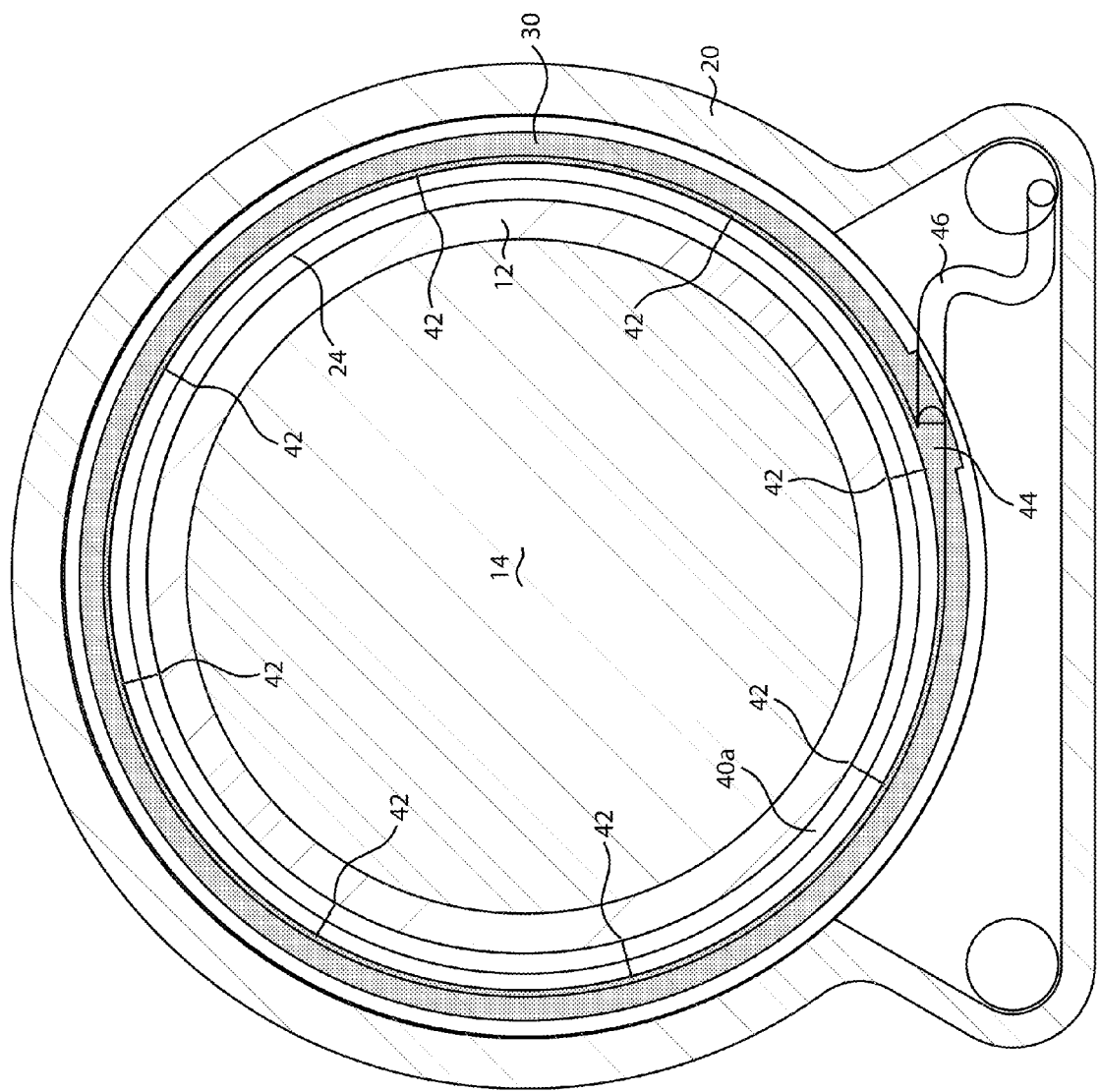
FIG. 3 is a cross sectional view taken through the seal end plate extension.

The extension 30 includes a drain hole 30a on the inboard side of the sealing interface 35. Any oil leaking past the sealing interface 35 is drained via hole 30a into the sump 28a. As shown in FIG. 3, the extension 30 also includes an outlet 44 communicating tangentially with the annular chamber 40a. A hose 46 is connected to the outlet 44 and leads to the exterior of the bearing for connection to a conventional mill lubrication system (not shown).

The outlet 44 is sized with respect to the volume of oil being received in the annular chamber 40a such that during steady state operation, that chamber remains filled with oil. As noted previously, both the seal 24 and sleeve 12 are mounted on and rotate with the roll neck 14. Thus, the impellers 42 carried by the seal 24 rotate with and at the velocity of the sleeve.

Figure 4:
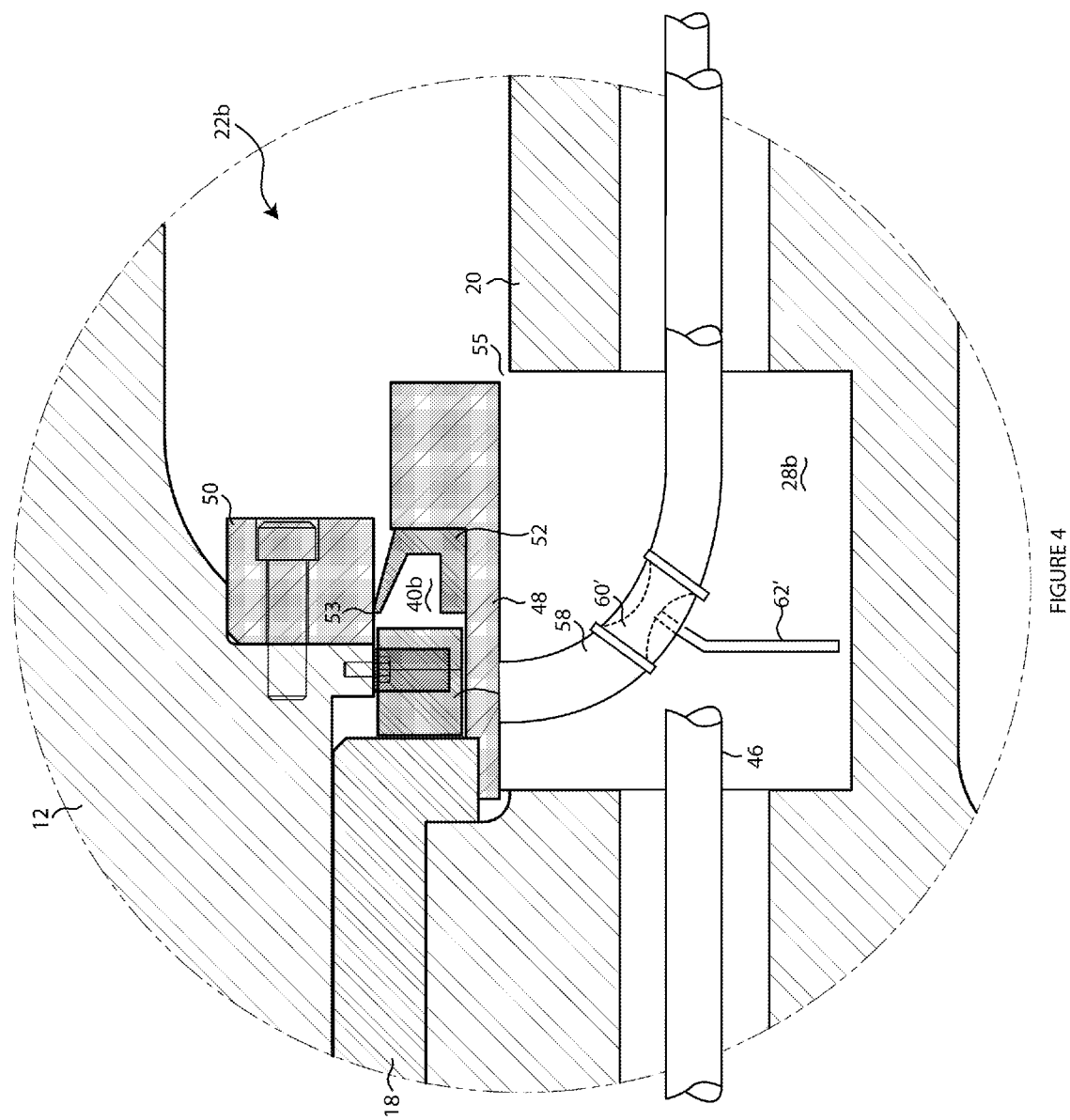
FIG. 4 is an enlarged view of the circled area marked "B" in FIG. 1.

With reference to FIG. 4, it will be seen that a similar arrangement is provided by the seal assembly 22b at the outboard end of the bearing. Here, an annular outboard chamber 40b is defined by confinement surfaces on an extension 48 extending between the bushing 18 and chock 20, a ring 50 secured to the sleeve 12, a lip seal 52 carried by the extension 48, and a sealing interface 53 between the lip seal 52 and ring 50. The impellers 42 are secured to and project radially from the sleeve 12 into the chamber 40b. Any oil leaking past the sealing interface 53 drains into the sump 28b via a space 55 between the extension 48 and chock 20.

Although not illustrated, it is to be understood that extension 48 includes an onboard outlet similar to the inboard outlet shown at 44 in FIG. 3. The outboard outlet communicates tangentially with outboard chamber 40b and is connected to a second hose 58.

Figure 2:
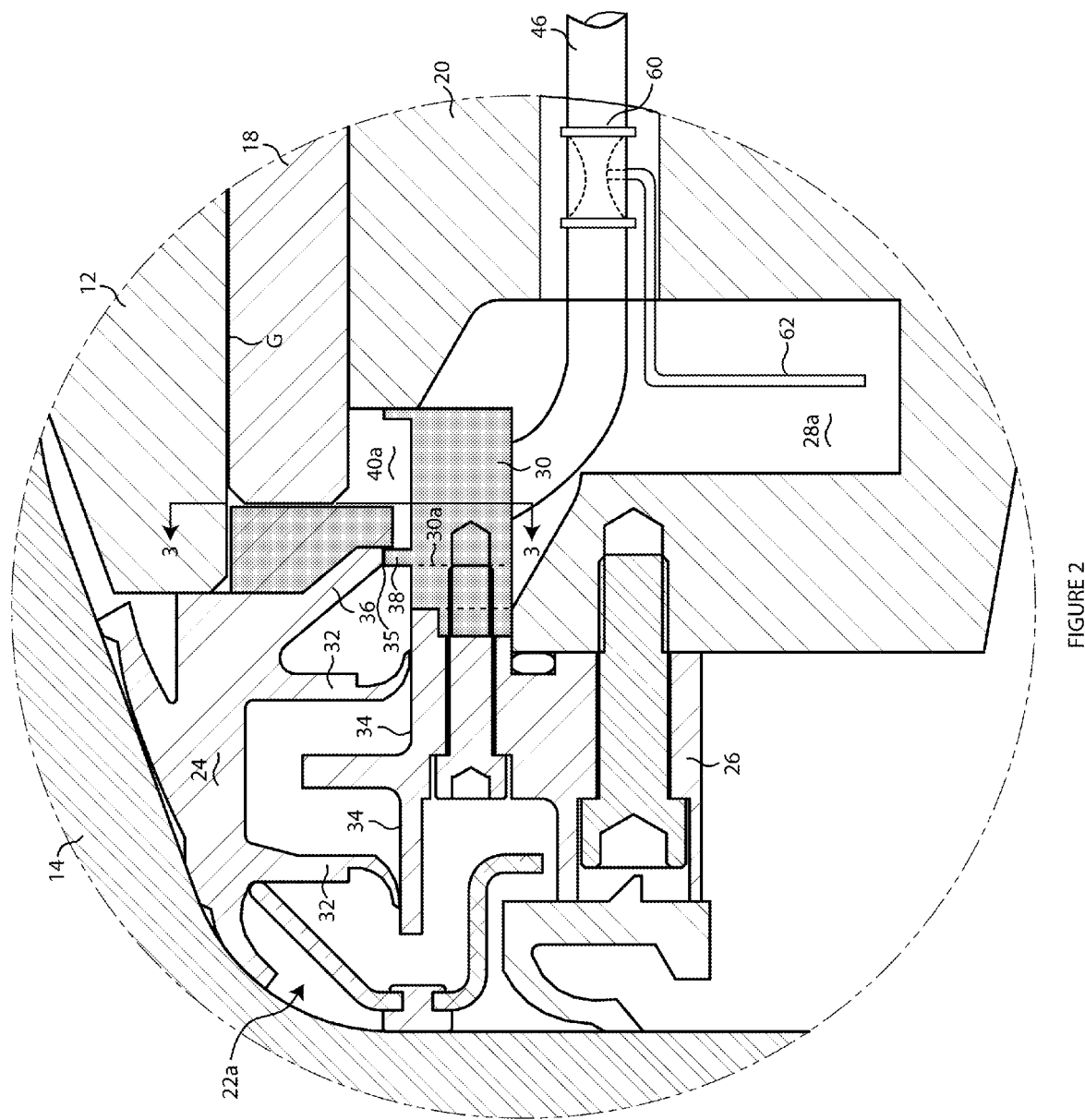
FIG. 2 is an enlarged view of the circled area marked "A" in FIG. 1.
Figure 5A:
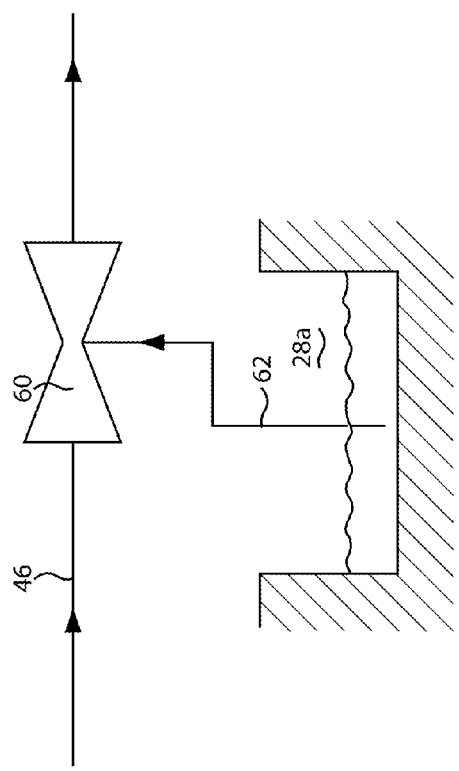
FIGS. 5A and 5B are schematic illustrations of alternative ways the venturis can be connected in the system.

As shown in FIGS. 2 and 5a, a venturi 60 is arranged in the discharge conduit 46. A suction conduit 62 connects the venturi to sump 28*a*. As shown in FIG. 4, a second venturi 60' in discharge conduit 58 is connected by a suction conduit 62' to sump 28*b*.

Figure 5B:
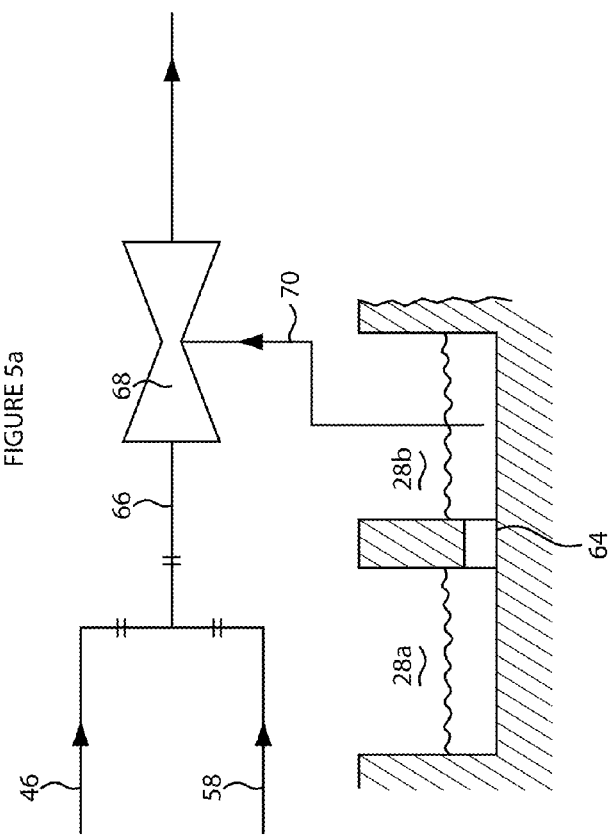

Alternatively, as shown in FIG. 5*b*, the two sumps 28*a*, 28*b* may be interconnected as at 64, and the two discharge conduits 46, 58 may be joined to a single conduit 66. A single venturi 68 may be located in conduit 66 and connected via a single suction conduit 70 to one of the sumps.

It thus will be seen that the impellers 42 serve to harness the rotating kinetic energy of selected bearing components (for example, the neck 24 at the inboard end and the sleeve 18 at the outboard end) to exert a pumping action which forcibly ejects oil from the annular chambers 40*a*, 40*b*. As noted above, by forcibly ejecting oil rather than relying on gravity flow, smaller diameter discharge conduits 46, 48 may be employed and strategically positioned without regard to the maintenance of gravity pitches.

Any leakage of oil past the sealing interfaces 35 and 53 into the sumps 28*a*, 28*b* will be aspirated by the venturis strategically located in the discharge conduits, thus insuring that all oil is efficiently recirculated during steady state operation of the bearing.

We claim:

1. A system for use in a rolling mill oil film bearing to remove oil exiting from between a rotating sleeve and a fixed bushing surrounding the sleeve, said system comprising:
   an annular chamber arranged to receive said exiting flow of oil, said chamber being isolated from a drainage sump by confinement surfaces including a seal interface defined by a flexible seal in contact with an adjacent rigid component of the bearing;
   impellers projecting into said chamber, said impellers being rotatable with and at the velocity of said sleeve to rotatively propel the oil around said chamber;
   a discharge conduit communicating tangentially with said chamber, said discharge conduit being arranged to receive a pressurized flow of the oil being rotatively propelled around said chamber;
   a venturi in said discharge conduit; and
   a suction conduit connecting said venturi to said drainage sump and through which the oil in said chamber escapes from said chamber past said seal interface into said drainage sump is aspirated for removal via said discharge conduit.

2. A system for use in a rolling mill oil film bearing to remove oil exiting from between a rotating sleeve and a fixed bushing surrounding the sleeve, said system comprising:
   an annular chamber arranged to receive said exiting flow of oil, said chamber being isolated from a drainage sump by confinement surfaces including a seal interface;
   impellers projecting into said chamber, said impellers being rotatable in the direction and at the velocity of said sleeve to rotatively propel the oil around said chamber;
   a discharge conduit communicating with said chamber, said discharge conduit being arranged to receive a flow of the oil being rotatively propelled around said chamber;
   a venturi in said discharge conduit; and
   a suction conduit connecting said venturi to said drainage sump and through which the oil in said chamber escapes from said chamber past said seal interface into said drainage sump is aspirated for removal via said discharge conduit.

3. The system of claim 2, wherein said sleeve is fixed to a tapered neck of a roll, and wherein said seal interface is defined by a flexible seal mounted on the roll neck and in contact with an adjacent rigid component of the bearing.

4. The system of claim 3, wherein said impellers are carried by and spaced around the circumference of said seal.

5. The system of claim 3, which said bushing is contained within a chock, wherein said flexible seal is surrounded by a seal end plate secured to said chock, and wherein said rigid component comprises an extension of said seal end plate.

6. They system of claim 2, wherein said impellers are secured to said sleeve for rotation therewith.

7. The system of claim 6, wherein said confinement surfaces are defined in part by an extension of said bushing and a ring secured to said sleeve and wherein said seal interface is defined by a lip seal carried by said extension and in contact with said ring.

8. The system of claim 2, wherein said discharge conduit communicates tangentially with said chamber.

9. In a rolling mill oil film bearing, a method of removing a laminar flow of oil exiting tangentially from between a rotating sleeve and a fixed bushing surrounding the sleeve, said method comprising:
   receiving the laminar flow of oil in an annular chamber isolated from a drainage sump by confinement surfaces including a sealing interface;
   rotatively propelling the oil around said chamber at the velocity of said rotating sleeve;
   removing the oil tangentially from said chamber at a rate such that said chamber remains filled with oil; and
   simultaneously aspirating and removing any oil escaping past said sealing interface into said sump.

* * * * *